United States Patent
Mougin et al.

(10) Patent No.: US 8,447,426 B2
(45) Date of Patent: May 21, 2013

(54) INSTALLATION FOR PALLETING COMBINED WITH SECURE ACCESS

(75) Inventors: Didier Mougin, Octeville-sur-Mer (FR); Christophe Alix, Octeville-sur-Mer (FR)

(73) Assignee: Sidel Participations, Octeville-sur-Mer (FR)

( * ) Notice: Subject to any disclaimer, the term of this patent is extended or adjusted under 35 U.S.C. 154(b) by 716 days.

(21) Appl. No.: 12/617,187

(22) Filed: Nov. 12, 2009

(65) Prior Publication Data

US 2010/0125361 A1     May 20, 2010

(30) Foreign Application Priority Data

Nov. 14, 2008  (FR) ...................................... 08 57727

(51) Int. Cl.
*G06F 7/00* (2006.01)
(52) U.S. Cl.
USPC ....... 700/217; 361/23; 414/788.1; 414/137.1; 700/248
(58) Field of Classification Search
USPC ......................................................... 700/217
See application file for complete search history.

(56) References Cited

U.S. PATENT DOCUMENTS

| 5,005,335 A * | 4/1991 | Yourgalite et al. ............. 53/399 |
| 2002/0178692 A1 * | 12/2002 | Panzarella et al. .............. 53/399 |
| 2004/0125206 A1 | 7/2004 | Lohmann |
| 2007/0163099 A1 * | 7/2007 | Townsend et al. ......... 29/402.01 |
| 2007/0211395 A1 * | 9/2007 | Svensson et al. ................ 361/23 |
| 2009/0028686 A1 * | 1/2009 | Tallis et al. ................. 414/793.4 |
| 2010/0043357 A1 | 2/2010 | Kobierzycki et al. |
| 2010/0068012 A1 | 3/2010 | Petijean |
| 2010/0310349 A1 * | 12/2010 | Bonhomme ............... 414/788.1 |

FOREIGN PATENT DOCUMENTS

| EP | 1 231 170 A1 | 8/2002 |
| FR | 2 907 100 A1 | 4/2008 |
| WO | 2008/043912 A1 | 4/2008 |

OTHER PUBLICATIONS

European Search Report for EP09173763, dated Mar. 12, 2010.

* cited by examiner

*Primary Examiner* — Gene Crawford
*Assistant Examiner* — Kyle Logan
(74) *Attorney, Agent, or Firm* — Sughrue Mion, PLLC

(57) ABSTRACT

An installation includes a machine (2) for packaging products (8) and of a robotic palleting station, both arranged in a same enclosure (1) that is provided with a door (7) that offers access to the palleting station. The installation includes a device which limits the range of movement of the robot (15) in the closed enclosure (1) in order to concentrate the displacements of its gripping head (17) in a restricted space which does not overlap with a safety space, which is defined according to a minimum distance measured from the immaterial barrier located in the enclosure in the vicinity of the door (7). The limiting device includes an electric cam that limits, under the control of the steering control of the robot, the amplitude of the movement of the robot (15) around its main axis and reduces its movement speed.

9 Claims, 2 Drawing Sheets

INSTALLATION FOR PALLETING COMBINED WITH SECURE ACCESS

FIELD OF THE INVENTION

This invention relates to an installation which comprises, in a combined manner, a robotic station for palleting carton cases and a packaging machine which converts said cases and carries out their filling with products that have been conditioned beforehand.

DESCRIPTION OF THE PRIOR ART

Generally, robotic installations are very dangerous for the operators who need to get close to the robot.

As such, for this type of robotic palleting installation, the operations of removing full pallets and inserting empty pallets are generally carried out by using an automatic type of conveyor; however, this type of installation usually requires a large ground surface area.

For compact installations, such as that which is the object of the invention, wherein the robotic palletizer is combined directly with a machine that carries out the packaging of products, it is conventional to secure the installation, i.e. to stop the robot, when a manual intervention must be carried out by an operator, such as the removing of a full pallet of cases or such as the inserting of an empty pallet. The robot stoppage occurs during the entire time required for these operations; but the stopping of the palleting robot also implies a stopping of the packaging machine to which it is associated.

These stoppages of the packaging machine cause production losses and they can also disturb the production upstream, such as is carried out, for example, during labelling or placing products into the next container.

This invention improves this type of compact installation which combines a packaging machine and a palletizer; it makes it possible in particular to offer a high degree of safety for the operator who is responsible for intervening operations with the palleting station and, above all, it allows this intervention of the operator without requiring a stoppage of the function(s) which are immediately upstream, while also retaining the reduced ground surface area required for the installation.

SUMMARY OF THE INVENTION

The installation according to the invention is comprised of a packaging machine for products and of a robotic palleting station of which the robot takes the cases filled with said products at the output of said packaging machine in order to arrange them, according to an appropriate diagram, by means of a gripping head, on a pallet that is adjacent to said exit, said packaging machine and said palleting station being arranged in the same closed enclosure which is comprised of lateral walls, a rear wall wherein penetrates, in particular, the cartons used for the converting operation of said cases, and a front wall which is provided with a door offering the access to said palleting station, said installation comprising means which limit the range of movement of said robot in said closed enclosure in order to concentrate the displacements of its gripping head in a restricted space which does not overlap onto the safety space which is defined at least according to a minimum distance measured using a means for detecting intrusion which is located on the opening of the access door to the palleting station, said means for limiting the range of movement of the robot are comprised of:

a cam, of the electric type, which ensures that the robot does not exit the authorised work zone and limits, in particular, the amplitude of its movement around its main axis no. 1, a member, of the switching type, which takes into account a request for intervention of the operator for access to the palleting station in order to remove the pallet full of cases and to replace it with an empty pallet, a steering control of said robot, of the automatic type, which manages said request from the operator in order to activate said electric cam and operate said robot in said restricted space contained inside the authorised volume of movement and programmed on said steering control.

Still according to the invention, the restricted space wherein the robot intervenes comprises at least one buffer zone which is arranged as a platform in order to allow for a temporary setting down of cases of products produced by the packaging machine, said platform can, in particular, be accessed by said robot, during the operation of extracting the pallet that is ready and during the setting into place of a new pallet to be filled.

According to another arrangement of the invention, the installation comprises, on the steering control of the robot, means for modifying the speeds of movement of the robot and in particular in order to reduce said speeds during its operating phase in the restricted space which is allocated to it.

Still according to the invention, the steering control of the robot also manages all of the movements of said robot while still ensuring that it does not exit the work zone which is programmed, i.e. this steering control of the robot comprises means for defining work spaces wherein the robot is authorised to operate as well as means for causing its immediate and total stoppage if it leaves these authorised operating spaces.

According to another arrangement of the invention, the installation comprises a sensor which is associated to the access door to the pallet, said sensor authorising, by the intermediary of the steering control of the robot, the continuation of the activity of the robot in its restricted space if the operator has requested access to the palleting station, or causes the immediate and total stoppage of said installation in the event of the absence of an access request or in the case where said access door is manoeuvred before the receiving of the authorisation for opening which is given by the intermediary of a lighted indicator associated to the switch.

Still according to the invention, the installation comprises, on the access door to the palleting station, a system for detecting an intrusion of the operator or other, in the safety space, said system for detecting, of the immaterial barrier type, is arranged in such a way as to allow the introduction of an empty pallet and in such a way as to cause the immediate and total stoppage of the installation in the event of intrusion of anyone in said safety space.

According to another arrangement of the invention, the installation comprises, associated to the immaterial barrier, means for inhibiting the latter, said means are comprised of photoelectric cells in order to allow for the extraction of the full pallet without causing the immediate and total stoppage of said installation.

Still according to the invention, the installation comprises means for signalling the end of the preparation cycle of a pallet with the cases of products that are exiting the machine for conditioning; said means are in the form of a lighted device.

According to another arrangement of the invention, the installation comprises, in the restricted space, one or several additional devices which can be accessed through the robot such as, for example, a case labelling station and/or a retrieval and transfer zone for cases intended for scrap, said retrieval zone being provided with a conveyor belt in order to evacuate said scrap towards the exterior of the installation.

BRIEF DESCRIPTION OF THE DRAWINGS

But the invention will also be detailed using the following description and the attached drawings, provided for the purposes of information, and wherein.

DETAILED DESCRIPTION OF THE INVENTION

Figure 1:
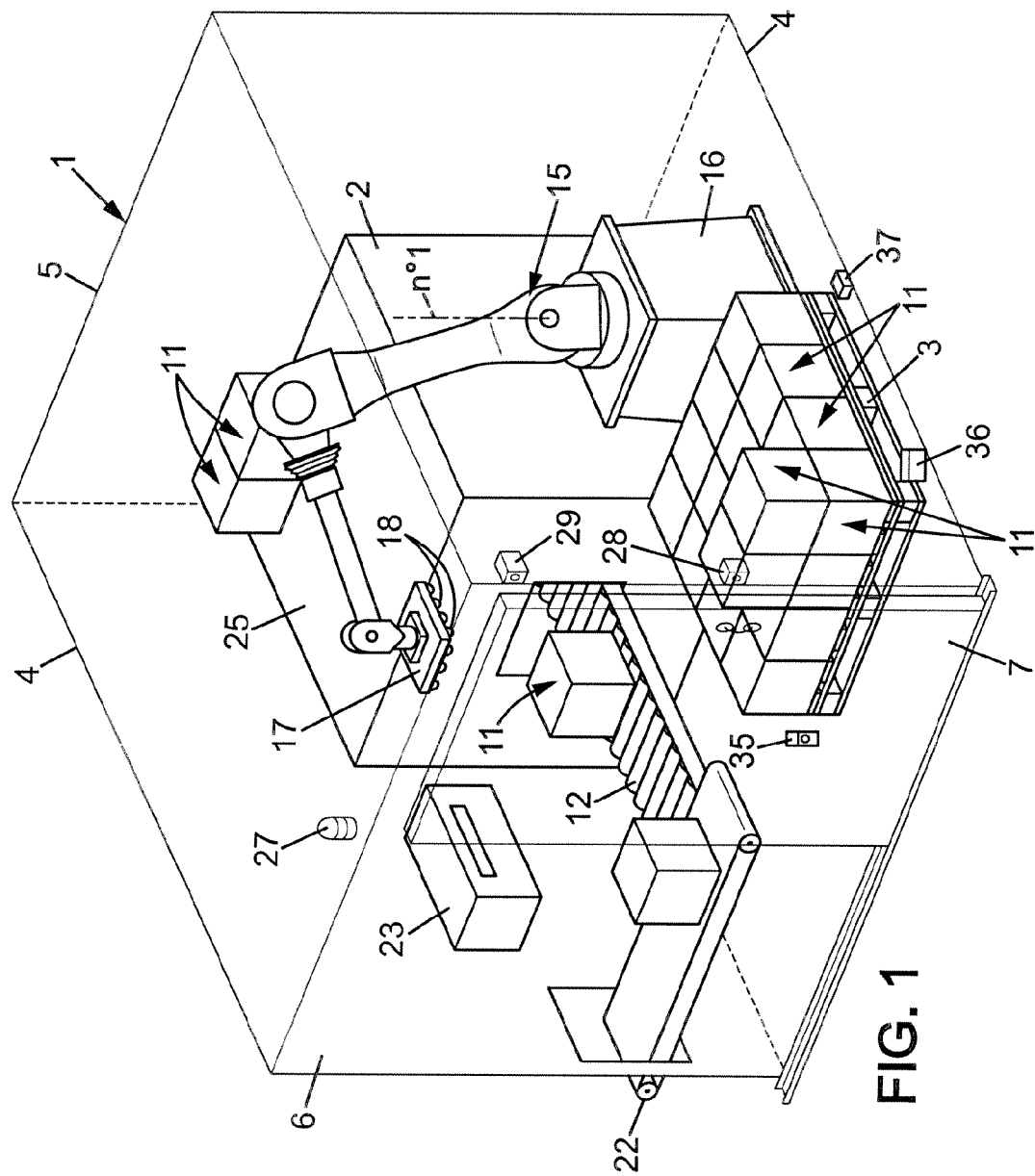
FIG. 1 is a general schematic view in perspective of an installation according to the invention which combines a machine for conditioning products and a palleting station.
Figure 2:
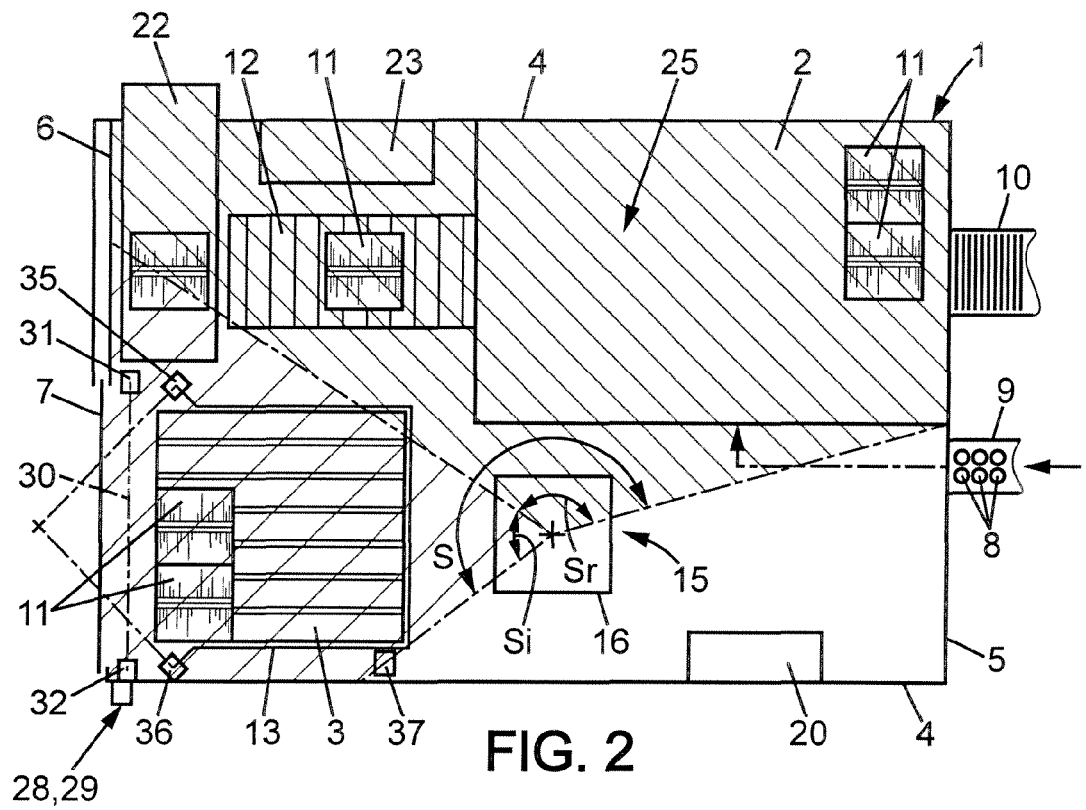
FIG. 2 is a schematic view on the installation plane according to the invention.

The installation shown in FIGS. 1 and 2, comprises, brought together in an enclosure 1 which is closed, a packaging machine 2 for products and a station for the pallet 3 where the automatic palleting operation takes place.

The enclosure 1 is closed by lateral walls 4, a rear wall 5 and a front wall 6 which comprises a door 7 in order to provide access to the pallet 3 which is located at the palleting station.

The machine 2 for conditioning is, for example, a machine of the type of that described in FR 2 907 100. It is fed with products 8 regularly by means of a conveyor 9, shown in FIG. 2, which introduces said products 8 by the rear wall 5 of the enclosure 1. This machine 2 further comprises a bin 10, also shown in FIG. 2, which makes it possible to supply it with carton blanks for the converting operation of the cases 11.

The products 8 are positioned in the cases 11 by the machine 2 and these cases 11 exit from said machine 2 onto a conveyor 12 which extends longitudinally in the enclosure 1.

The palleting station can comprise a frame 13, shown in FIG. 2, which makes it possible to centre the pallets 3 in a zone which is located across from the door 7, and on the side of the conveyor 12.

A robot 15 is arranged behind the palleting station, on the side of the packaging machine 2. This robot 15 is mounted on a base 16 which is placed on the ground or which is integral with the general chassis of the entire installation. This robot 15 comprises several arms and it pivots around its main axis no. 1 which is a vertical axis, said axis no. 1 corresponding to the first axis in relation to base 16.

This robot 15 is provided with a gripping head 17 which is located at the end of its different arms. This gripping head 17, provided with suction cups 18, captures the cases 11 in order to arrange them according to an appropriate diagram on the pallet 3.

The volume V in the enclosure 1, wherein the robot 15 is authorised to move, is programmed in a steering control 20 of said robot 15 and this control, of the automatic type, is incorporated into said enclosure 1.

All of the installation operates with this steering control 20 of the robot 15 which is responsible, with the appropriate programmes, for operating the robot 15 and, in particular, for allowing for the operation of palleting of the cases 11 according to a diagram that is adapted to said cases and to the pallet 3.

This robot 15 can also interact with additional equipment such as, for example, a conveyor 22 arranged at the downstream end of the conveyor 12, said conveyor 22 retrieving any scrap and transferring it towards the exterior of the installation.

The robot 15 can also interact with a device 23 that carries out the labelling of the cases 11 before arranging them on the pallet 3.

The packaging machine 2 operates continuously; it operates at the speed at which it is supplied with products 8. The robot 15 provides for the palleting of the cases 11 as they exit from the machine 2; its gripping head 17 of the cases 11 circulates in a volume which is programmed in the steering control 20 of the robot 15 and this volume V is included within the enclosure 1 in order to place said cases 11 according to the distribution diagram provided for the pallet 3.

When the pallet 3 is full, the robot 15 is programmed to continue to operate and to handle the cases 11 that continue to exit from the packaging machine 2.

The installation comprises a buffer zone which includes a platform 25 arranged, for example, above the packaging machine 2. The buffer zone makes it possible for the robot 15 to temporarily set down the cases 11, while the operator intervenes to remove the pallet 3, which is full, and to install a new pallet at the palleting station.

In order to allow the operator to intervene in complete safety, the robot 15 comprises means which make it possible to limit the maximum amplitude of its movements in the volume V. The means for limiting the amplitude includes an electric cam, and makes it possible to define, authorise and/or prohibit sectors for the moving of the robot 15 around its main axis no. 1.

The steering control 20 of the robot 15 manages, by the intermediary of this electric cam, all of the movements of said robot 15 while ensuring that it does not exit from the work zone which is programmed, i.e. this steering control 20 comprises means for defining the work spaces wherein said robot is authorised to operate as well as means for causing its immediate and total stoppage if it leaves these authorised operating spaces.

In FIG. 2, note that the robot 15 has a major sector S of intervention which corresponds to the horizontal projection of the volume V. This major sector S is the sum of two sectors Sr and Si:—the sector Si which corresponds to a space wherein the presence of the robot 15 can be prohibited momentarily and—the sector Sr which corresponds to a restricted space wherein said robot 15 can operate according to a programme that is adapted to the situation, as explained hereinafter.

The prohibited space for the robot 15, which corresponds to the sector Si, extends inside sector S starting from the frame of the door 7. This prohibited space corresponds to a minimum volume which is defined by a distance measured at least using means, detailed further on, which make it possible to detect an intrusion in the enclosure 1; these means of detection are located beyond the door 7, inside of said enclosure 1 and this minimum distance is of a magnitude of 50 cm in the installation such as is shown in the figures; this distance can vary according to the type of robot and in particular according to the stopping distance of said robot during an emergency stop.

During normal operation, when the door 7 is closed, the robot 15 has full latitude to operate within the space that corresponds to the sector S.

When the pallet 3 is full, and when the operator intervenes in order to, on the one hand, evacuate this full pallet and, on the other hand, position a new pallet 3, the intervention space of the robot 15 is limited to the sector Sr which is the restricted sector, i.e. a sector which allows the robot 15 to grasp the cases 11 at the output of the machine 2 and to place them in the temporary storage zone, on the platform 25 which doubles as a buffer.

In this sector Sr, the steering control 20 of the robot 15 can be programmed so that the latter operates at speeds which are less than those that it uses in the sector S, i.e. in the sector which corresponds to its normal operating cycle.

The sector Si corresponds, for the robot 15, to the space which is secured and wherein there is a danger for the operator, in particular when his intervention to remove the pallet which is full and to introduce a new pallet 3.

In order to carry out this operation of removing a full pallet and introducing a new pallet 3, the operator is first of all informed. Means, comprised of a warning indicator 27, of the lighted or other type, installed on the enclosure 1, informs him that the pallet is full.

In order to carry out this operation of extracting the full pallet and in order to install a new pallet 3 in the frame 13, the operator has a member of the switch type 28. This switch 28 allows him to transmit to the steering control 20 of the robot 15, his intention to access the palleting station.

In this case, the robot 15 completes its task in progress and will position itself in the sector Sr. From this point, through the steering control 20, the robot 15 is confined to this sector Sr, i.e. to the restricted sector which allows it, in particular, to take the cases 11 at the output of the machine 2 and to set them down temporarily on the platform 25.

The working speed of the robot 15, during the normal palleting cycle, is sufficiently high in order to allow it to resume later the cases 11 stored on the platform 25 and to arrange them on the pallet with the other cases which are exiting from the packaging machine 2.

On the other hand, as soon as the robot 15 is located in the sector Sr, a lighted signal of the lighted indicator type, associated to the switch 28, informs the operator that all of the safety conditions have been satisfied and that he is authorised to open the door 7.

Still for the safety of the operator, the installation comprises a sensor 29 which interacts with the door 7 in order to inform, the steering control 20 of robot 15, that said door is in closed position or in open position.

This sensor 2 makes it possible to secure the installation if the door 7 is manipulated by any person, without having been authorised beforehand, i.e. before the lighted indicator of the switch 28 is lit.

Figure 3:
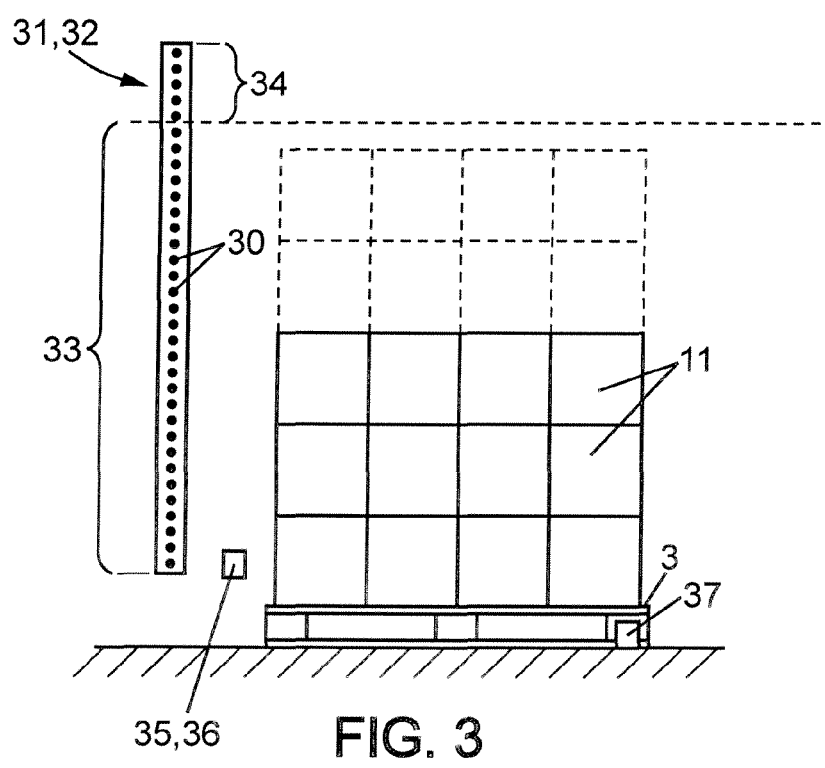
FIG. 3 is a partial side view of the installation showing the palleting station and the means for anti-intrusion, in the form of immaterial barriers.

In light of the fact that the robot 15 operates in its restricted space Sr when the door 7 is open, an immaterial barrier 30, shown in FIGS. 2 and 3, makes it possible to secure the installation, i.e. to stop it, if the operator or another person penetrates into the enclosure 1 via the door 7.

This barrier 30 is comprised of ramps 31 and 32 which are vertical. These ramps comprise photoelectric cells and they are arranged in the enclosure 1, at a distance from the door 7, behind the frame of the latter. More preferably, the distance that defines the prohibited space for the robot 15, when the door 7 is open, is measured from the immaterial barrier 30; this distance is, for example, of a magnitude of 50 cm as indicated hereinabove.

FIG. 3 shows the location of the immaterial barrier 30, on the height of the opening of the enclosure 1. The ramps 31 and 32 of this barrier 30 are arranged at a certain distance from the ground, of a magnitude of 30 cm, for example; said barrier 30 is located in fact at a level which is above the upper level of the pallet 3, when it is empty of course, in such a way as to allow for the introduction of this pallet 3 into the frame 13, at the palleting station, without the risk of cutting the beams of the cells of said immaterial barrier 30.

In order to improve the safety, this barrier 30 can also comprise a first active zone 33 which extends to the height corresponding to that of the full pallet and a second zone 34, also active, but permanently.

The zone 33 of the immaterial barrier 30 can be placed into an inactive situation, the time needed to remove the full pallet. Means make it possible to inhibit this zone 33 of the barrier 30; they are comprised, for example, of a pair of cells 35, 36, which are located inside the enclosure 1.

At the time of its exit, the full pallet cuts the beams of the cells 35 and 36 for inhibition before those of the barrier 30, which results, by the intermediary of the steering control 20, in the deactivating of said barrier during the exiting phase of said full pallet.

The inhibition of the immaterial barrier 30 is cancelled as soon as the full pallet is longer across from the beams of the cells of said barrier 30.

Introducing a new pallet 3 at the palleting station is carried out without cutting the various beams as said empty pallet passes under the level of the various beams.

Still in reference to FIG. 3, note the presence of a sensor 37 which makes it possible to inform the steering control 20 of the robot 15 of the presence or of the absence of a pallet at the palleting station.

After the extraction of the full pallet and the setting in place of an empty pallet, the operator closes the door 7 and resumes the normal cycle of the robot 15 with another intervention on the switch 28. After validation of the closing of the door 7 by the sensor 29, the robot 15 resumes, under the control of the steering control 20, its activity throughout all of the sector S, i.e.: gripping cases 11 on the conveyor 12 at the output of the packaging machine 2 and/or gripping cases stored on the platform 25 in light of their palleting.

What is claimed is:
1. An installation comprising:
a machine for packaging products;
a robotic palleting station including a robot that takes cases filled with said products at an output of said machine for packaging, and arranges said products on a pallet according to a predetermined diagram, by means of a gripping head, the pallet adjacent to an exit of a closed enclosure in which said machine for packaging and said palleting station are arranged, said enclosure having lateral walls, a rear wall through which cartons used for a converting operation of said cases enter said closed enclosure, and a front wall which is provided with a door providing access to said palleting station from outside said closed enclosure;
means for limiting the range of movement of said robot in said closed enclosure in order to limit displacements of the gripping head to be within a restricted space which does not overlap with a safety space which is defined according to a minimum distance measured using a means for detecting intrusion which is located on said door, said means for limiting the range of movement of said robot comprising:
an electric cam, which limits an amplitude of the movement of said robot around its main axis,
a switching member, for indicating a request for intervention of an operator to access the palleting station in order to remove the full pallet and to set an empty pallet,
a steering control, which activates said electric cam, based on an indication of the switching member, to operate said robot in said restricted space contained inside an authorised volume V of movement and programmed on said steering control, wherein said restricted space, in which the robot is limited to operate during intervention of an operator, comprises at least one buffer zone that includes a platform for temporarily setting down the cases produced by the machine for packaging, said platform accessed by said robot during the operation of extracting the full pallet and during setting of the empty pallet to be filled.

2. The installation according to claim 1, wherein the steering control includes means for reducing speeds of movement of the robot when the robot moves in the restricted space.

3. The installation according to claim 1, wherein the steering control includes means for defining work spaces in which said robot is authorised to operate and means for causing immediate and total stoppage of said robot if said robot leaves the restricted space.

4. The installation according to claim 1, further comprising a sensor associated with the door, said sensor authorising, via the steering control, continuation of movement of the robot in the restricted space if the operator has requested access to the palleting station, and causes immediate and total stoppage of said installation when the door is open before the steering control provides authorisation.

5. The installation according to claim 1, wherein the door includes a system for detecting an intrusion of the operator or other, in the safety space, said system for detecting, of the immaterial barrier type, is arranged to allow the introduction of an empty pallet and to cause immediate and total stoppage of the installation in the event of intrusion of the operator or other.

6. The installation according to claim 5, further comprising photoelectric cells for deactivating the barrier in order to allow extraction of the full pallet without causing immediate and total stoppage of said installation.

7. The installation according to claim 1, further comprising means for signalling an end of a preparation cycle of a pallet with the cases of products that are exiting the machine for conditioning, said means including a lighted warning indicator.

8. The installation according to claim 1, further comprising a labelling station accessible to the robot.

9. The installation according to claim 1, further comprising a conveyor accessible to the robot to evacuate scrap towards the exterior of the installation.

* * * * *